March 24, 1942.  R. L. FITCH  2,277,431
MAGNETIC INSPECTION APPARATUS
Filed Feb. 1, 1940  3 Sheets-Sheet 2
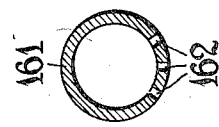
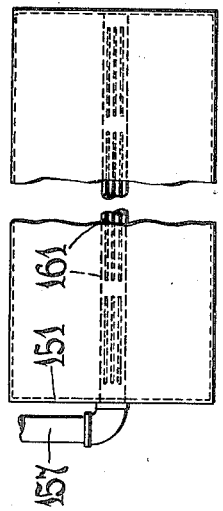
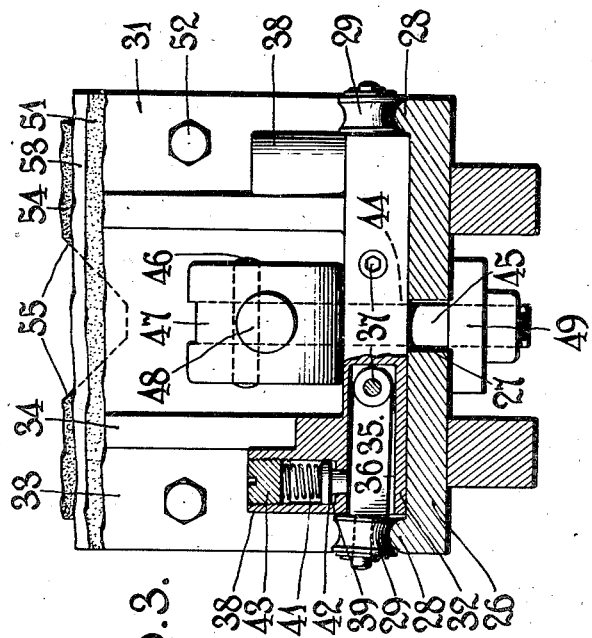
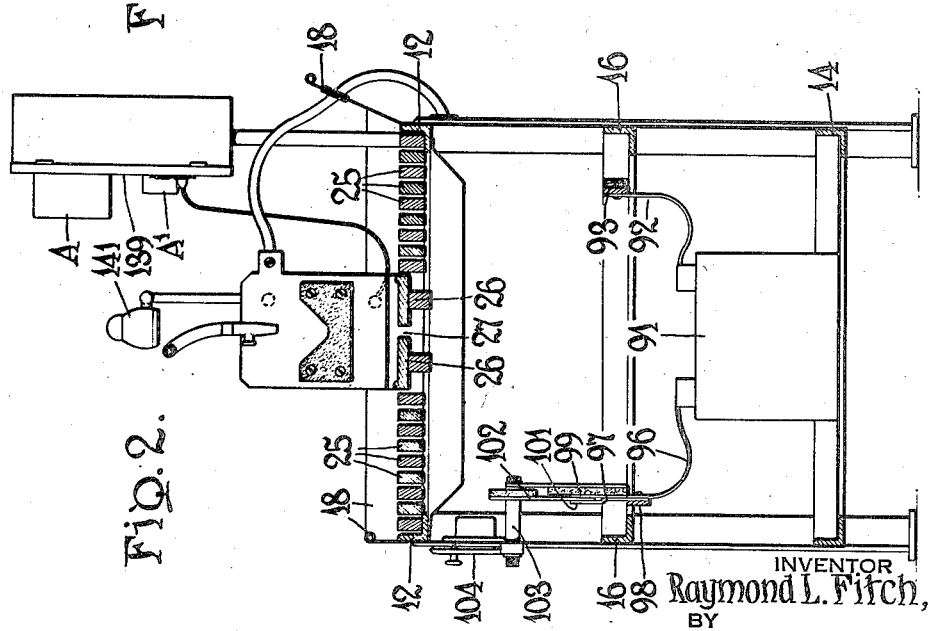
INVENTOR
Raymond L. Fitch,
BY
Bean, Brooks, Buckley & Bean
ATTORNEYS

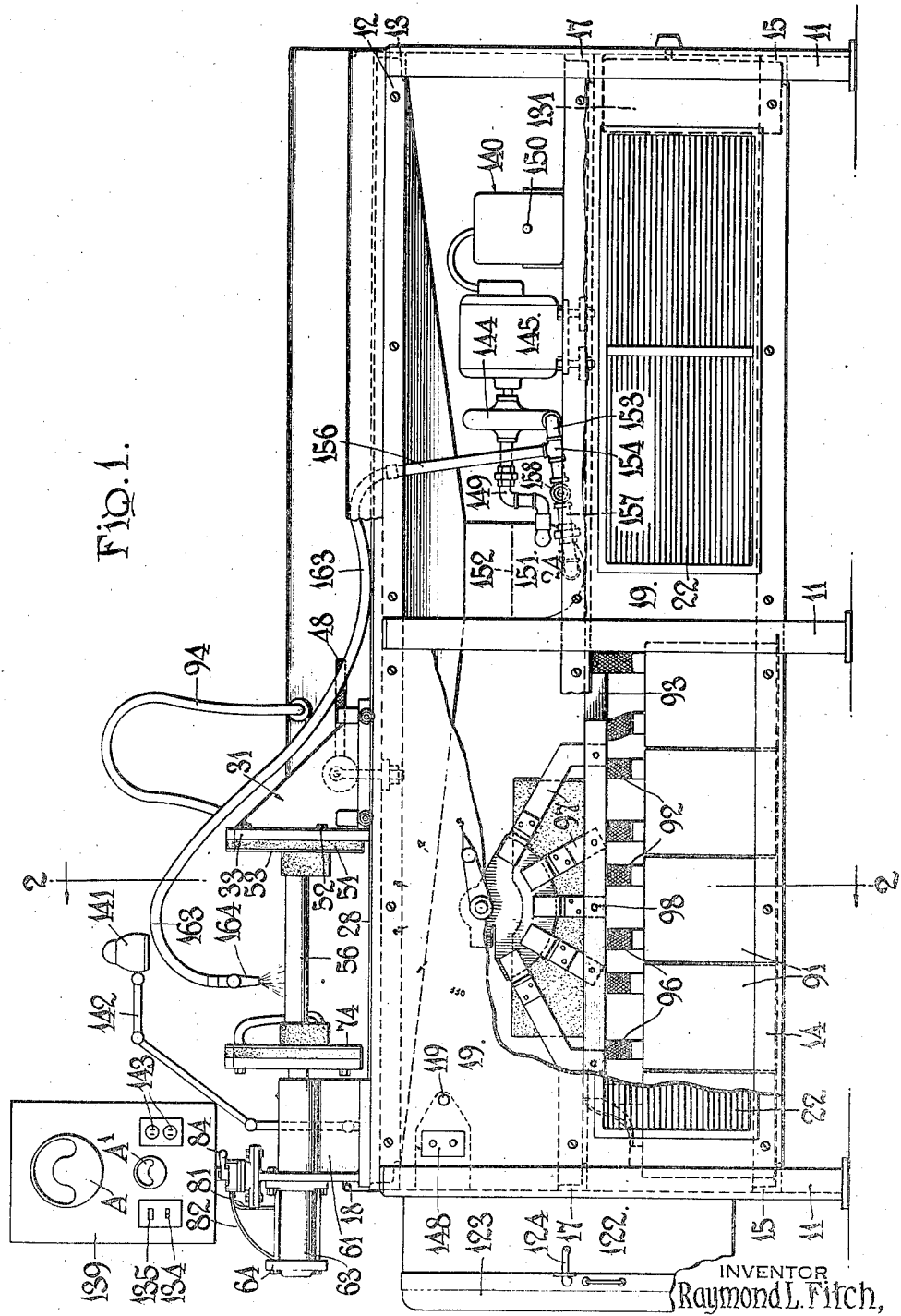

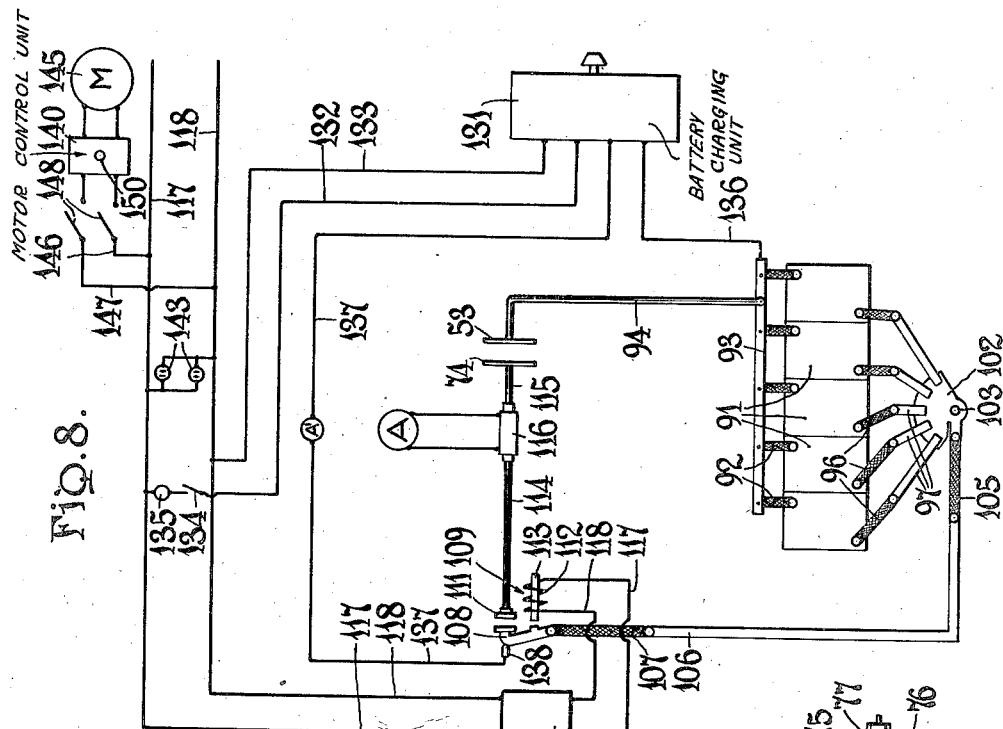
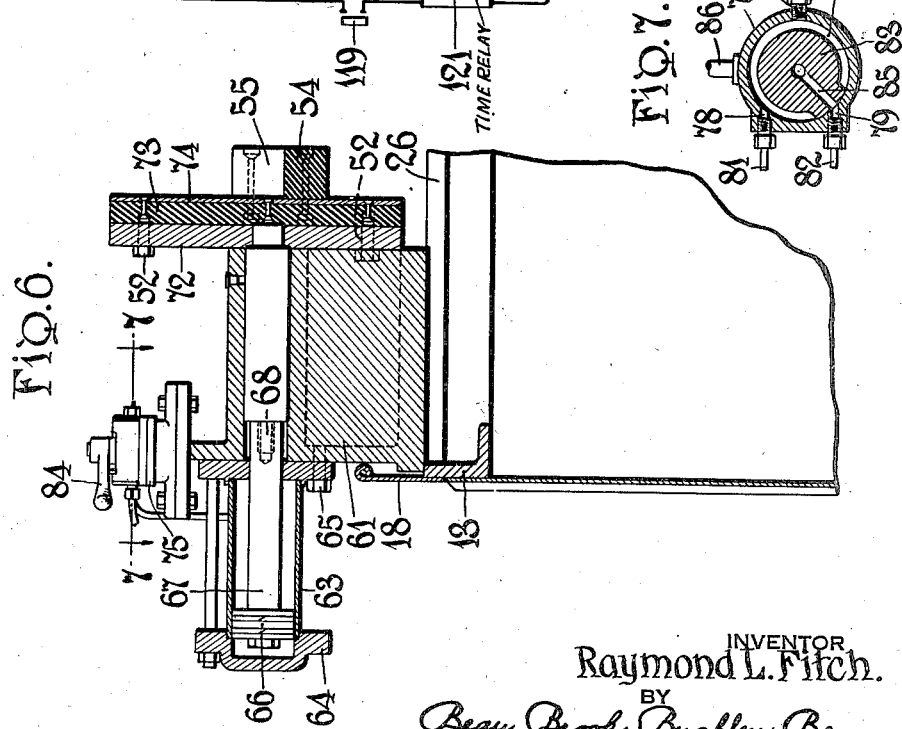

Patented Mar. 24, 1942

2,277,431

UNITED STATES PATENT OFFICE 2,277,431

MAGNETIC INSPECTION APPARATUS

Raymond L. Fitch, Buffalo, N. Y.

Application February 1, 1940, Serial No. 316,790

7 Claims. (Cl. 175—183)

The present invention relates to the magnetic testing of objects of paramagnetic material, and has for its main objectives the provision of an improved apparatus on which such objects may be tested with certainty and rapidity and to an improved method of testing.

The invention contemplates a cabinet unit including a tank over which the objects to be tested may be mounted between movable electrodes. The electrodes may be connectible by suitable switch means to storage batteries supported within the cabinet, whereby large electrical currents may be passed through the object to be tested. Means for conducting a liquid, which supports paramagnetic particles in suspension or solution, from the tank to the article to be tested, and for maintaining the particles suitably admixed with the liquid so that uniform observations may be made, are associated with the cabinet.

One of the electrodes is mounted upon a roller supported carriage movable upon a suitable track, whereby the electrode may be readily adjusted to accommodate test objects of widely different sizes, the abrasive effect of the testing solution upon relatively movable parts being largely obviated by the provision of rollers. Means are associated with the carriage to clamp it in any position to which it may be adjusted.

The other electrode is carried by a fluid pressure operated device controlled by suitable valve means to effect relatively small movements of the electrode toward or away from the carriage supported electrode, whereby the operator may cause the object to be tested to be engaged by the electrodes with a relatively large and constant pressure, or, by reversing the valve means, may effect prompt disengagement of the object from the electrodes.

These and other objects and advantages of my improved method and apparatus will become apparent from the following description of the typical embodiment of the invention shown in the accompanying drawings, wherein:

Fig. 1 is a front elevational view of the apparatus, with parts thereof broken away;

Fig. 2 is a vertical sectional view taken approximately upon line 2—2 of Fig. 1;

Fig. 3 is a fragmentary vertical sectional view showing the electrode carriage partially in elevation and partially in section;

Fig. 4 is a bottom plan view of a sump portion of the tank;

Fig. 5 is a cross-sectional view taken through a liquid discharge tube disposed in the sump shown in Fig. 4;

Fig. 6 is a fragmentary longitudinal sectional view illustrating the fluid pressure actuated electrode carrier;

Fig. 7 is a sectional view taken along line 7—7 of Fig. 6; and,

Fig. 8 is a wiring diagram illustrating the electrical circuits included in the apparatus.

The unit comprises a framework consisting of uprights 11 connected by longitudinally and transversely extending horizontal angle bars, the upper of such bars being designated respectively 12 and 13, the lower 14 and 15, and the intermediate 16 and 17. The framework is covered with sheet metal including upstanding guard flanges 18 extending about the top of the cabinet, and also including panels 19 removably mounted on the front wall of the cabinet by releasable fasteners 21 which are secured to members 12, 14 and 16. The panels 19 may include grilles 22 for ventilating the cabinet interior.

Upon the top of the cabinet, supported by angle bars 12 and 13 is a tank 23 whose bottom slopes toward the center of the cabinet where the tank merges into a sump 24. Supported above the tank upon the framework is a work table comprising closely spaced bars 25 of wood or other suitable material. Extending lengthwise of the cabinet and disposed substantially midway between the front and rear walls thereof are rails 26 of substantially T-section, the inner or adjacent flanges of the rails being spaced to provide a slot 27 therebetween. The outer flanges of the rails are provided with upstanding, preferably rounded, track portions 28, upon which may roll wheels 29 of electrode carriage 31.

The carriage may be a metal casting comprising a base 32, an upstanding wall 33, and spaced web portions 34. The wheels 29 are mounted upon axles 35 which extend into openings 36 in the base 32 and are pivoted to the latter at their inner ends, as indicated at 37 in Fig. 3. A boss 38 formed on a web 34 above each axle 35 has a bore 39 containing a spring 41 and a plunger 42 pressed by the spring against the axle. By means of a cap screw 43 threaded into bore 39 and bearing upon the spring 41, the pressure which the latter exerts upon the axle 35 may be varied.

For clamping the carriage to the rails, a bolt 45 is extended through an opening 44 in base 32 and through the slot 27 between the flanges of rails 26. Through the upper end of the bolt extends a cross pin 46 pivoting the bolt to an eccentric member 47 which engages the base 32 and is provided with a handle 48. Secured to the lower end of bolt 45 is a plate 49 engaging under the rail flanges. When in the position shown in Figs. 1 and 3 the eccentric 47, acting through bolt 45 and plate 49, clamps the carriage directly upon the top of the rails 26, the axles 35 being tilted upwardly about pivots 37 and the springs 41 being compressed. When it is desired to shift the carriage longitudinally along rails 26, the handle 48 may be raised to release the clamp, whereupon the springs 41 will move the axles downwardly relative to the carriage, raising the latter from engagement with rails 26 and allowing it to be rolled on the wheels 29 along track portions 28.

A block 51 of fiber, or other suitable electrical insulation material, is secured by fasteners 52 to the upstanding wall 33 of the carriage, and to the block 51 is secured an electrode 53 which may consist of a plate of copper. Upon the exposed face of the latter is secured a block 54 of insulating material provided with a notch or recess 55 for receiving one end of an article to be tested on the apparatus, shown in the drawings as being a rod 56.

Upon the left end of the rails 26, as the apparatus appears in Figs. 1 and 6, is secured a casting 61 upon which is mounted a horizontal cylinder 63 having cylinder heads 64 and 65. Within the cylinder is a piston 66 secured to a piston rod 67 which extends through head 65 and is joined at 68 to a rod 69 supported for reciprocation in a bore 71 in the casting 61. Upon the opposite end of rod 69 is carried a plate 72 to which is secured by fasteners 52 a block of insulation 73, similar to block 51. On the outer face of block 51 is an electrode 74, which, like electrode 53, carries a block 54 of insulation having notch 55 for receiving one end of an article to be tested.

Mounted upon an extension from the casting 61 is a valve casing 75 provided with a chamber 76. The latter as shown in Fig. 7 is vented to the atmosphere at 77, and has outlet ports 78 and 79 connectible by means of conduits 81 and 82 respectively to ports opening into the cylinder 63 through cylinder heads 65 and 64. Angularly movable within chamber 76 is a valve member 83, operable by a handle 84. The member 83 has a port 85 adapted to register with either port 78 or port 79, depending upon the position of handle 84, port 85 being in communication with a suitable source of fluid pressure, in the present instance to a compressed air line 86.

Upon movement of valve handle 84 to the right, in Figs. 1 and 6, causing ports 85 and 79 to register, air will enter the outer end of cylinder 63 through head 64, forcing the piston, and the electrode 74 which is movable therewith, toward electrode 53, thereby firmly clamping the object to be tested, 56, therebetween. Upon movement of the valve handle to the left, causing ports 85 and 78 to register, air will enter the inner end of cylinder 63, moving the piston and electrode 74 to the retracted position shown in Fig. 6, releasing the object to be tested.

Within the cabinet are mounted a plurality of storage batteries 91, each having one terminal connected by a strap 92 to a bus bar 93, the latter being connected by an insulated cable 94 to electrode 53. Each of the opposite battery terminals is connected by a strap 96 to one of the several pairs of contact fingers 97, each pair being mounted on an insulated bar 98 and comprising inner and outer metal fingers 99 and 101 between which may be received the arcuate marginal portion of a metallic sector 102. This sector, which may be a plate of copper, is carried by a shaft 103 which is pivoted on an insulated mounting and has a handle 104 on the front wall of the cabinet whereby it may be turned to engage between one or more of the pairs of fingers 97. Thereby one or more of the batteries 91 may be placed in parallel circuit.

The sector 102 is electrically connected by strap 105 to a bus bar 106 which in turn is connected by a metallic strip 107 to movable contact 108 of a magnetic circuit breaker 109. This device also includes a stationary contact 111 and an actuating magnet comprising coil 112 and armature 113 which, when energized, closes contacts 108 and 111. Contact 111 is connected by cables 114 and 115 to electrode 74, a shunt 116, across which ammeter A is connected, being connected between the cables.

The circuit for coil 112 of circuit breaker 109 includes lead wires 117 and 118 connectible to a suitable source of electrical energy. In this circuit is a push button switch 119 preferably mounted on the front wall of the cabinet, as is shown in Fig. 1, and a time relay device 121 of any suitable form, this device opening the circuit 117, 112, 118 after it has been closed for a predetermined time interval, notwithstanding that the circuit may remain closed at the push button switch 119 by the operator continuing to hold the switch button depressed. The circuit breaker 109 and time device 121 may be mounted in the box 122 which is mounted on the left end wall of the cabinet and has a hinged door 123 held closed by latch 124.

Mounted at the opposite end of the cabinet is a battery charging unit 131 having input wires 132 and 133 respectively connected to lead wires 117 and 118, a switch 134 and indicator lamp 135 being included in series in the circuit. The output circuit of the charging unit comprises wire 136, connected to bus bar 93, and wire 137, in which is interposed ammeter A', connected to a contact 138. The latter is so mounted as to be engaged by movable contact 108 when the circuit breaker 109 is in open position. Switch 134, lamp 135, charging ammeter A', and discharge ammeter A are preferably mounted on a panel 139 as shown in Fig. 1 within convenient view of the operator.

When switch 134 is closed, lamp 135 will normally light, advising the operator that the charging unit 131 is in operation, and the batteries 91 will be on charge when the magnetic circuit breaker contacts 108, 111 are open. When the latter are closed, however, the output charging circuit is interrupted by movement of contact 108 away from fixed contact 138, preventing the high amperage discharge current from affecting the charging system.

A lamp 141 mounted upon a suitable flexible bracket 142 for directing light upon the object of inspection, may be electrically connected, as may be other accessories, to outlet sockets 143 mounted on the panel 139 and connected in parallel across leads 117, 118.

Mounted within the cabinet at the end thereof adjacent the charging unit 131, is a centrifugal liquid pump 144 connected for operation to an electric motor 145, the latter being connected to leads 117, 118 by wires 146 and 147, the motor circuit including a switch 148 which may be mounted on the front wall of the cabinet adjacent push button switch 119. An automatic motor control unit 140 having a reset button 150 on the front face of the cabinet may be included in the motor circuit between the switch 148 and the motor.

The inlet to pump 144 is through conduit 149 from end wall 151 of sump 24 at a point below the normal liquid level indicated by line 152. The pump outlet 153 branches at T-fitting 154 into pipe 156 and conduit 157. The latter contains valve 158 and opens into a discharge tube 161 which extends across the sump 24, adjacent the bottom thereof, and is provided with slots 162 from which fluid is discharged into the sump.

Connected to pipe 156 is a flexible hose 163 having a valved discharge nozzle 164. When the motor driven pump 144 is operating, liquid drawn from the sump through conduit 149 is discharged into pipe 156 and conduit 157, the pressure in pipe 156 being dependent upon and capable of being regulated by the degree of opening of valve 158.

The liquid may be any suitable liquid mixture including a finely divided paramagnetic material but preferably consists of kerosene in which is suspended finely divided black iron oxide, the discharge from pump 144 through slots 162 in tube 161 maintaining the material uniformly admixed.

A paramagnetic article to be tested, 56, may be placed against electrode 53, the carriage 31 having been adjusted to receive an article the length of member 56. Valve handle 84 is then thrown to the right causing the electrode 74 to move against the piece 56 and clamp it to the electrode 53. Valved nozzle 164 may now be opened and suitably guided to cause the testing liquid, containing paramagnetic particles in suspension, to flow over the test piece, excess liquid passing through bars flowing to the sump 24.

The switch button 119 may now be depressed, the time device 121 and circuit breaker 109 functioning, momentarily, to close the discharge circuit including electrodes 53 and 74, causing a high amperage current to flow through the test piece. As is well understood in this art, the resulting magnetic field will cause sub-surface defects in the test piece to be evidenced by dark lines on the surface, resulting from the accumulations of the paramagnetic particles in the solution.

By throwing the switch handle 104 to place different numbers of batteries in the discharge circuit, and by experience in observation, the operator by successive tests may determine the nature of any defects in the test piece 56. During the course of the testing, the piece may be turned, as desired, or removed, by throwing the valve handle 84 to the left, causing retraction of electrode 74.

With my apparatus uniform and accurate testing may be readily accomplished because the testing liquid is maintained well agitated, with the finely divided particles of paramagnetic material uniformly dispersed therethrough, and the pressure of contact of the electrodes is constant so long as the compressed air source remains at constant pressure, insuring proper and uniform electrical contact.

The liquid pressure at the discharge nozzle, preferably only high enough to insure flow of good quantity, is readily adjustable by means of valve 158.

By reason of the roller and clamp construction of the electrode carriage 31, the latter may be easily adjusted to permit accommodation of test pieces of different length, the rollers, operating on the elevated and rounded tracks 28 which will readily shed liquid, preventing the scoring and binding of parts due to abrasive action of the testing liquid which has been encountered in testing devices employing sliding parts.

It will be understood that the apparatus and method shown and described herein are merely illustrative of the several novel features involved, and that these may be otherwise embodied and employed, without departing from the spirit of the invention or the scope of the appended claims.

I claim:

1. In apparatus for magnetically testing paramagnetic bodies, a tank having a sump therein and containing a liquid having finely divided paramagnetic material in solution therein, clamping means comprising a pair of electrodes disposed above said tank, means for placing a fluid urge upon said electrodes for clamping therebetween under a constant pressure a body to be tested, a pump having inlet and outlet connections to said sump for circulating and constantly agitating the liquid therein for maintaining thorough dispersion of said material, a conduit branching from said pump for conducting agitated fluid to the body to be tested for flow thereover, means for momentarily causing a high amperage discharge between said electrodes through the body to be tested, and means for varying the rate of such discharge.

2. In apparatus for magnetically testing paramagnetic bodies, a tank containing a liquid having finely divided paramagnetic material in solution therein, clamping means comprising a pair of electrodes disposed above said tank and adapted to support a body to be tested, a pump having inlet and outlet connections to said tank for circulating and constantly agitating the liquid therein for maintaining thorough dispersion of said material, and a conduit branching from said pump for conducting agitated fluid to the body to be tested for flow thereover, a valve for controlling the discharge from said conduit, and a valve for controlling the passage of fluid from the pump outlet into said tank to thereby control the effective pressure in said conduit.

3. In apparatus for magnetically testing paramagnetic bodies, a tank containing a liquid having finely divided paramagnetic material in solution therein, clamping means comprising a pair of electrodes disposed above said tank, means for placing a fluid urge upon said electrodes for clamping therebetween under a constant pressure a body to be tested, a pump having an inlet connection to said tank and an outlet connected to a conduit for conducting fluid to the body to be tested for flow thereover, and means for momentarily causing a high amperage discharge between said electrodes through the body to be tested.

4. In apparatus for magnetically testing paramagnetic bodies, a tank having a sump therein and containing a liquid having finely divided paramagnetic material in solution therein, a pair of electrodes disposed above the tank and adapted to support a body to be tested, means for bringing liquid from the sump into contact with such body, and means for agitating said liquid to maintain the finely divided material uniformly dispersed therein, said means comprising a pump having an inlet opening from said sump and an outlet pipe extending into said sump and having discharge orifices therein.

5. In apparatus for magnetically testing paramagnetic bodies, a tank, a table above said tank having openings therethrough for the drainage of liquid into the tank, a pair of electrodes, a carriage on said table supporting one of said electrodes, said carriage being movable toward or away from the other electrode to accommodate bodies of different sizes between the electrodes and said carriage including means for clamping the carriage to said table, a fluid pressure operable device carrying the other electrode, and means for actuating said device to effect movement of said other electrode away from the carriage supported electrode or under a fluid pressure toward the last mentioned electrode, and means for conducting fluid from the tank and over a body to be tested which is supported between said electrodes.

6. In apparatus for magnetically testing paramagnetic bodies, a tank containing a liquid having finely divided paramagnetic material in suspension therein, a table above said tank comprising a pair of rail means having elevated track portions extending therealong, an electrode above said tank, a second electrode and a supporting carriage therefor, said carriage having rollers engaging and movable along said track portions to adjust the distance between said electrode to accommodate paramagnetic bodies of different lengths, resilient means connecting said rollers to the carriage for urging the latter out of contact with said rail means, a clamp associated with the carriage for clamping it to said rail means against the resistance of said resilient means, and means for causing a flow of said liquid from the tank over a paramagnetic body received between said electrodes.

7. In apparatus for magnetically testing paramagnetic bodies, a tank containing a liquid having finely divided paramagnetic material in suspension therein, a pair of electrodes above the tank and means for causing a flow of said liquid from the tank over a body received between said electrodes, a carriage for one of the electrodes having roller means, said table having an elevated track portion upon which the roller means is adapted to operate, resilient means associated with the roller means and the carriage for raising the latter relative to the roller means out of contact with said table to prevent abrasion of said carriage and table by said paramagnetic material when the carriage is moved relative to the table, and means for clamping the carriage to the table against the resistance of said resilient means.

RAYMOND L. FITCH.

DISCLAIMER 2,277,431.—*Raymond L. Fitch*, Buffalo, N. Y. MAGNETIC INSPECTION APPARATUS. Patent dated Mar. 24, 1942. Disclaimer filed Oct. 1, 1945, by the inventor.
Hereby disclaims as his invention the subject matter recited by claims 3, 4, and 7.
[*Official Gazette November 13, 1945.*]